(12) United States Patent
Dai et al.

(10) Patent No.: US 11,050,308 B2
(45) Date of Patent: Jun. 29, 2021

(54) ELECTROMAGNETIC MACHINE INCLUDING A SPHERICAL STATOR HAVING WINDING-ASSISTANCE PROTRUBERANCES FORMED THEREON

(71) Applicant: HONEYWELL INTERNATIONAL INC., Morris Plains, NJ (US)

(72) Inventors: Jason Dai, Shanghai (CN); Pablo Bandera, Avondale, AZ (US); Peter Yang, Shanghai (CN); Yonghui Zhang, Shanghai (CN); Qiang Li, Shanghai (CN); Jing Wang, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 464 days.

(21) Appl. No.: 16/035,878

(22) Filed: Jul. 16, 2018

(65) Prior Publication Data
US 2020/0021149 A1    Jan. 16, 2020

(51) Int. Cl.
*H02K 1/12* (2006.01)
*H02K 3/28* (2006.01)
*H02K 1/27* (2006.01)

(52) U.S. Cl.
CPC ............... *H02K 1/12* (2013.01); *H02K 1/27* (2013.01); *H02K 3/28* (2013.01); *H02K 2201/18* (2013.01)

(58) Field of Classification Search
CPC ........ H02K 1/12; H02K 1/27; H02K 2201/18; H02K 1/18; H02K 3/46
USPC ...................................................... 310/254.1
See application file for complete search history.

(56) References Cited

U.S. PATENT DOCUMENTS 4,707,642 A * 11/1987 Sorimachi ............ B25J 17/0275
310/12.27
7,675,208 B2    3/2010 Bandera
9,893,574 B2    2/2018 Bandera
(Continued)

FOREIGN PATENT DOCUMENTS

| EP | 3249794 A2 | 11/2017 | |
| FR | 2452193 A1 * | 10/1980 | ........... H02K 41/025 |
| JP | 04125054 A * | 4/1992 | |

OTHER PUBLICATIONS

Oohira (JP 04125054 A) English Translation (Year: 1992).*
Kaminski (FR 2452193 A1) English Translation (Year: 1980).*

*Primary Examiner* — Tulsidas C Patel
*Assistant Examiner* — Robert E Mates
(74) *Attorney, Agent, or Firm* — Lorenz & Kopf, LLP

(57) ABSTRACT

An electromagnetic machine includes a spherical stator, an armature, a first coil, and a second coil. The spherical stator has an outer surface, and the outer surface has a plurality of spaced-apart protuberances formed thereon. Each protuberance extends radially from, and is disposed normal to, the outer surface. The armature is disposed adjacent to the spherical stator and includes a magnet that emanates a magnetic field. The magnet has at least one of its magnetic poles facing the spherical stator. The first coil is wound around at least a portion of the spherical stator, and is disposed between the plurality of spaced-apart protuberances and along latitudinal lines of the spherical stator. The second coil is wound around at least a portion of the spherical stator, and is disposed between the plurality of spaced-apart protuberances and along longitudinal lines of the spherical stator.

19 Claims, 5 Drawing Sheets

(56) References Cited

U.S. PATENT DOCUMENTS

2011/0273052 A1\* 11/2011 Long ............... H02K 16/02
  310/208
2014/0125153 A1\* 5/2014 Ho ............... H02K 21/26
  310/36

\* cited by examiner

ELECTROMAGNETIC MACHINE INCLUDING A SPHERICAL STATOR HAVING WINDING-ASSISTANCE PROTRUBERANCES FORMED THEREON

TECHNICAL FIELD

The present invention generally relates to electromagnetic machines, and more particularly relates to an electromagnetic machine that includes a spherical that has protuberances formed thereon that assist in winding of the coils thereon.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

One solution to the above-described problems is disclosed in U.S. Pat. No. 7,675,208, entitled "Global Pointing Actuator." The electromagnetic machine disclosed therein includes a spherical stator with a "latitude coil" and a "longitude coil" wound thereon. This machine, however, also exhibits certain drawbacks. For example, the latitude and longitude coils are physically difficult to wind onto the spherical stator. This adds to the overall cost and size, and reduces coil efficiency.

Hence, there is a need for a multi-degree of freedom spherical electromagnetic machine that is relatively smaller, less cumbersome, and more efficient than known devices and/or allows for relatively less difficulty in winding the coils thereon. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an electromagnetic machine includes a spherical stator, an armature, a first coil, and a second coil. The spherical stator has an outer surface, and the outer surface has a plurality of spaced-apart protuberances formed thereon. Each protuberance extends radially from, and is disposed normal to, the outer surface. The armature is disposed adjacent to the spherical stator and includes a magnet that emanates a magnetic field. The magnet has at least one of its magnetic poles facing the spherical stator. The first coil is wound around at least a portion of the spherical stator, and is disposed between the plurality of spaced-apart protuberances and along latitudinal lines of the spherical stator. The second coil is wound around at least a portion of the spherical stator, and is disposed between the plurality of spaced-apart protuberances and along longitudinal lines of the spherical stator.

In another embodiment, an electromagnetic machine includes a spherical stator, an armature, a first coil, a second coil, and a third coil. The spherical stator has an outer surface and is formed of a magnetically permeable material. The outer surface has a plurality of spaced-apart protuberances formed thereon, and each protuberance extends radially from, and is disposed normal to, the outer surface. The armature is disposed adjacent to the spherical stator and includes a magnet that emanates a magnetic field. The magnet has at least one of its magnetic poles facing the spherical stator. The first coil is wound around at least a portion of the spherical stator, and is disposed between the plurality of spaced-apart protuberances and along latitudinal lines of the spherical stator. The second coil is wound around at least a portion of the spherical stator, and is disposed between the plurality of spaced-apart protuberances and along longitudinal lines of the spherical stator. The third coil is wound around at least a portion of the spherical stator, and is disposed between the plurality of spaced-apart protuberances and along the longitudinal lines of the spherical stator. The second coil is wound around the spherical stator in a first winding direction, the third coil is wound around the spherical stator in a second winding direction, and the second direction is opposite the first direction.

In yet another embodiment, an electromagnetic machine includes a hollow spherical stator, an armature, a first coil, a second coil, and a third coil. The spherical stator has an outer surface and is formed of a magnetically permeable material. The outer surface has a plurality of spaced-apart protuberances formed thereon, and each protuberance extends radially from, and is disposed normal to, the outer surface. The armature is disposed adjacent to the spherical stator and includes a magnet that emanates a magnetic field. The magnet has at least one of its magnetic poles facing the spherical stator. The first coil is wound around at least a portion of the spherical stator, and is disposed between the plurality of spaced-apart protuberances and along latitudinal lines of the spherical stator. The second coil is wound around at least a portion of the spherical stator, and is disposed between the plurality of spaced-apart protuberances and along longitudinal lines of the spherical stator. The third coil is wound around at least a portion of the spherical stator, and is disposed between the plurality of spaced-apart protuberances and along the longitudinal lines of the spherical stator. The spherical stator is formed by a 3D printing process, the second coil is wound around the spherical stator in a first winding direction, the third coil is wound around the spherical stator in a second winding direction, and the second direction is opposite the first direction.

Furthermore, other desirable features and characteristics of the electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
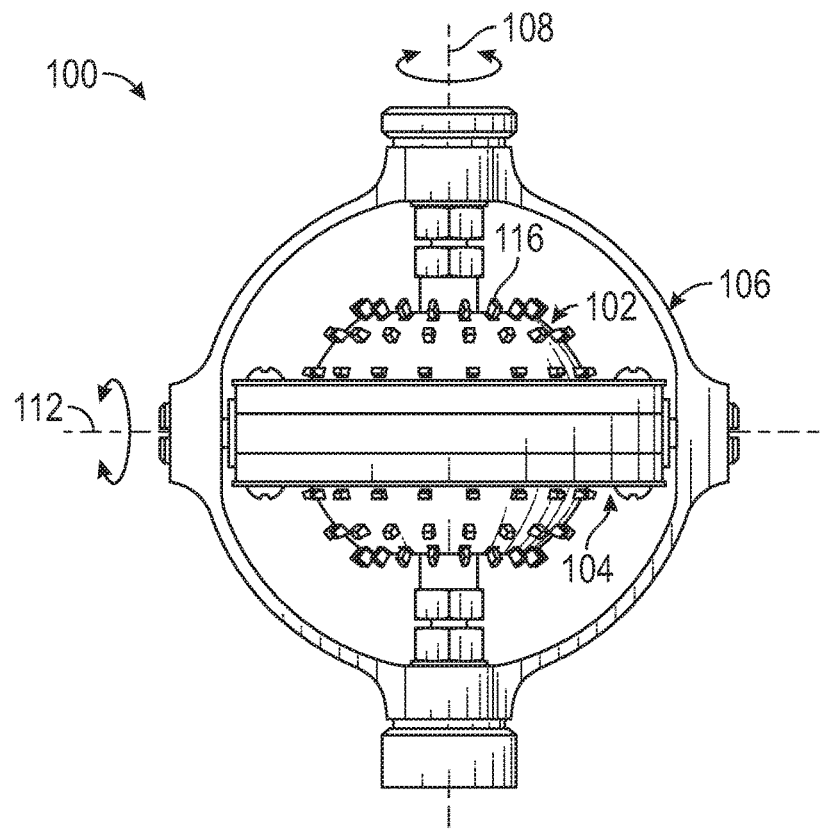
FIG. 1 depicts a front view of one embodiment of a multi-degree of freedom electromagnetic machine.
Figure 2:
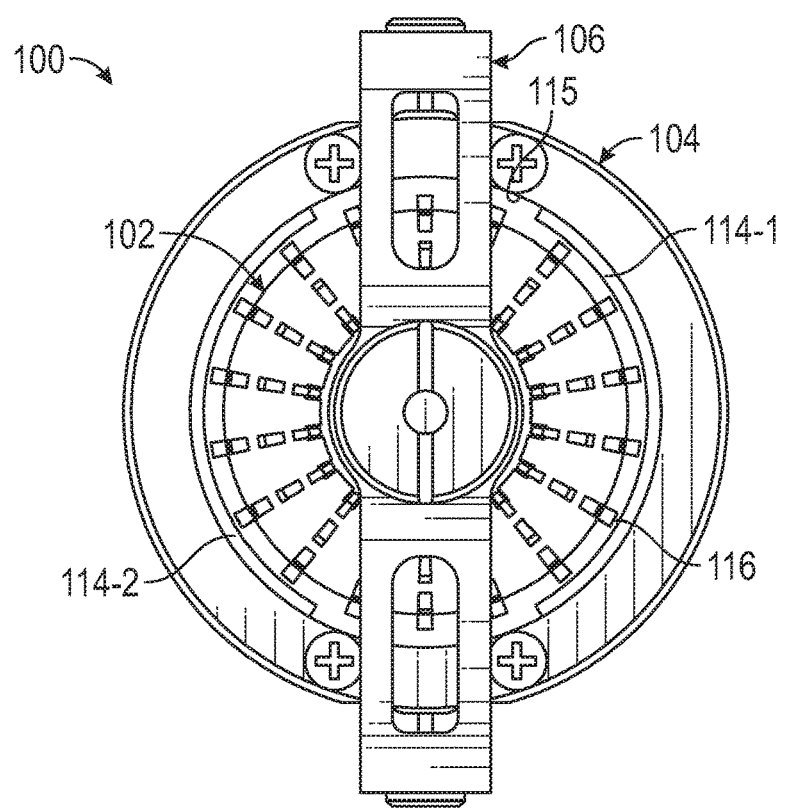
FIG. 2 depicts a top view of the multi-degree of freedom electromagnetic machine depicted in FIG. 1.
Figure 3:
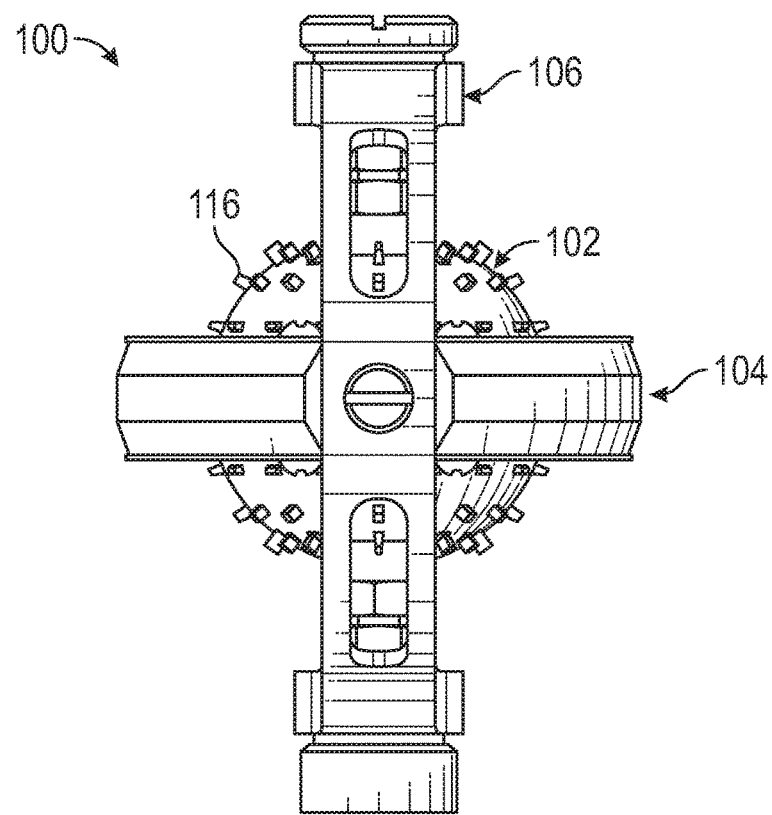
FIG. 3 depicts a side view of the multi-degree of freedom electromagnetic machine depicted in FIG. 1.

Referring first to FIGS. 1-3, front, top, and side views, respectively, of one embodiment of a multi-degree of freedom electromagnetic machine 100 is depicted and includes a spherical stator 102 and an armature 104. The spherical stator 102 and the armature 104 are mounted, at least in the depicted embodiment, to a gimbal structure 106. Although the spherical stator 102 and armature 104 may be variously mounted to the gimbal structure 106, in the depicted embodiment the spherical stator 102 is mounted, via suitable mounting hardware, such that the gimbal structure 106 (and concomitantly the armature 104) will rotate, relative to the spherical stator 102 about a first rotational axis 108. In addition, the armature 104 is mounted, via suitable mounting hardware, such that it will rotate, relative to the spherical stator 102 and the gimbal structure 106, about a second rotational axis 112 that is perpendicular to the first rotational axis 108.

Regardless of how the spherical stator 102 and armature 104 are specifically mounted to the gimbal structure 106, it is seen that the armature 104 is disposed adjacent to, and is spaced apart from, the spherical stator 102. The armature 104, which preferably comprises a magnetically permeable material such as, for example, iron or an iron alloy, includes at least one magnet that emanates a magnetic field. In the depicted embodiment, as shown more clearly in FIG. 2, the armature 104 includes two magnets 114—a first magnet 114-1 and a second magnet 114-2—that are coupled to, and extend inwardly from, an inner surface 116 of the armature 104. It will be appreciated that although the depicted embodiment includes two magnets 114, the electromagnetic machine 100 could be implemented with more or less than this number of magnets. It will additionally be appreciated that the magnets 114 may be variously shaped and dimensioned. For example, in the depicted embodiment the magnets 114 are generally arc-shaped, but in other embodiments the magnets 114 may be semi-spherically shaped, or any one of numerous other shapes if needed or desired. It will additionally be appreciated that the arc length of the magnets 114 may be varied, and that the magnets 114 may be permanent magnets or, if needed or desired, electromagnets.

Moreover, while the portion of the magnets 114 that face the spherical stator 102 are preferably, for efficiency, contoured similar to the spherical stator 102, these portions need not be so contoured. In the depicted embodiment, for example, the magnets 114 are each coupled to, and extend inwardly from, an inner surface 115 of the armature 104. In other embodiments, the magnets 114 may be integrally formed as part of the armature 104, or may be formed separately but surrounded by at least a portion of the armature 104.

In the depicted embodiment, the magnets 114 are disposed such that the magnetic pole facing the spherical stator 102 is spaced apart therefrom by a predetermined gap. The gap, when included, is preferably small enough to minimize losses, which increases the magnetic efficiency by reducing magnetic reluctance. A relatively larger gap may allow for a more cost-effective design by loosening mechanical tolerances. In other embodiments, the magnets 114 may be disposed such that the magnetic pole contacts the spherical stator 102. In such embodiments, the material selection of the contacting surfaces is chosen in consideration of wear and frictional losses, as is known in the art.

Regardless of its shape, dimension, configuration, and implementation, each magnet 114 emanates a magnetic field, and each is preferably arranged such that the polarity of the first magnet 114-1 relative to the spherical stator 102 is opposite to the polarity of the second magnet 114-2. For example, if the north pole (N) of the first magnet 114-1 is disposed closer to the spherical stator 102, then the south pole (S) of the second magnet 114-2 will be disposed closer to the spherical stator 102, and vice-versa.

Figure 4:
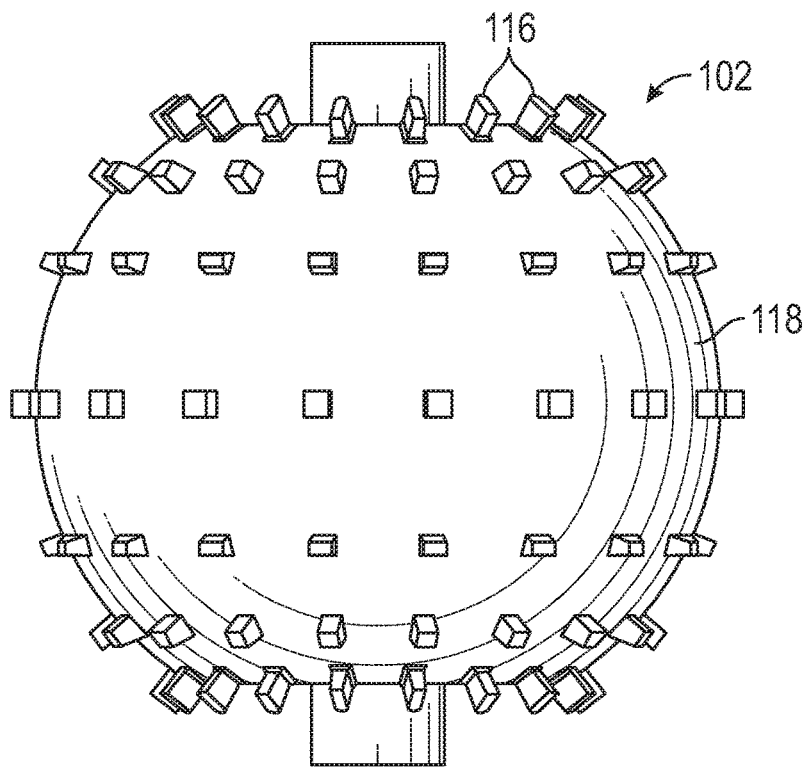
FIGS. 4 and 5 depict front and top views, respectively, of one embodiment of a spherical stator that may be used to implement the multi-degree of freedom electromagnetic machine depicted in FIG. 1.
Figure 5:
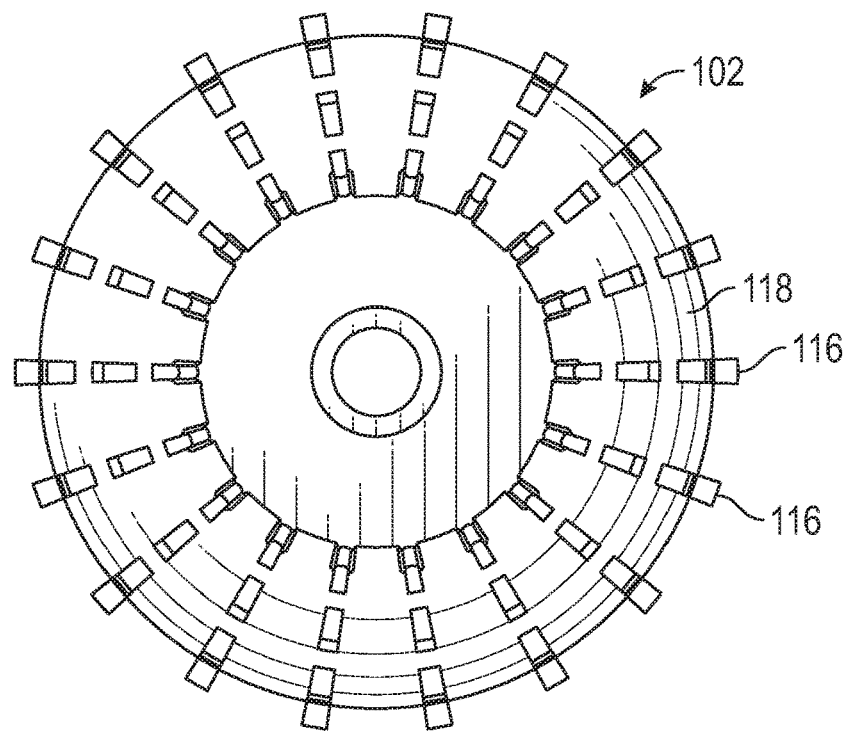

As FIGS. 1-3 also depict, and as FIGS. 4 and 5 depict even more clearly, the spherical stator 102 has a plurality of spaced-apart protuberances 116 formed on its outer surface 118. Each of the protuberances 116 extends radially from, and is disposed normal, to the outer surface 118. The purpose of the protuberances 116 is to facilitate the winding of coils onto the spherical stator 102. To more clearly depict the protuberances, the coils are not illustrated in FIGS. 1-5. The manner in which the coils are wound on the spherical stator 102, and how the protuberances 116 facilitate this winding, will be described momentarily.

Before doing so, however, it is noted that spherical stator 102 is preferably hollow, and comprises a magnetically permeable material. It will be appreciated that the specific magnetically permeable material may vary, and may include a magnetically permeable plastic material or an iron or iron alloy. The spherical stator 102 may be formed by a casting process or by a three-dimensional (3D) printing process. In one preferred embodiment, the spherical stator 102 comprises a magnetically permeable plastic material and is formed by a 3D printing process.

Figure 6:
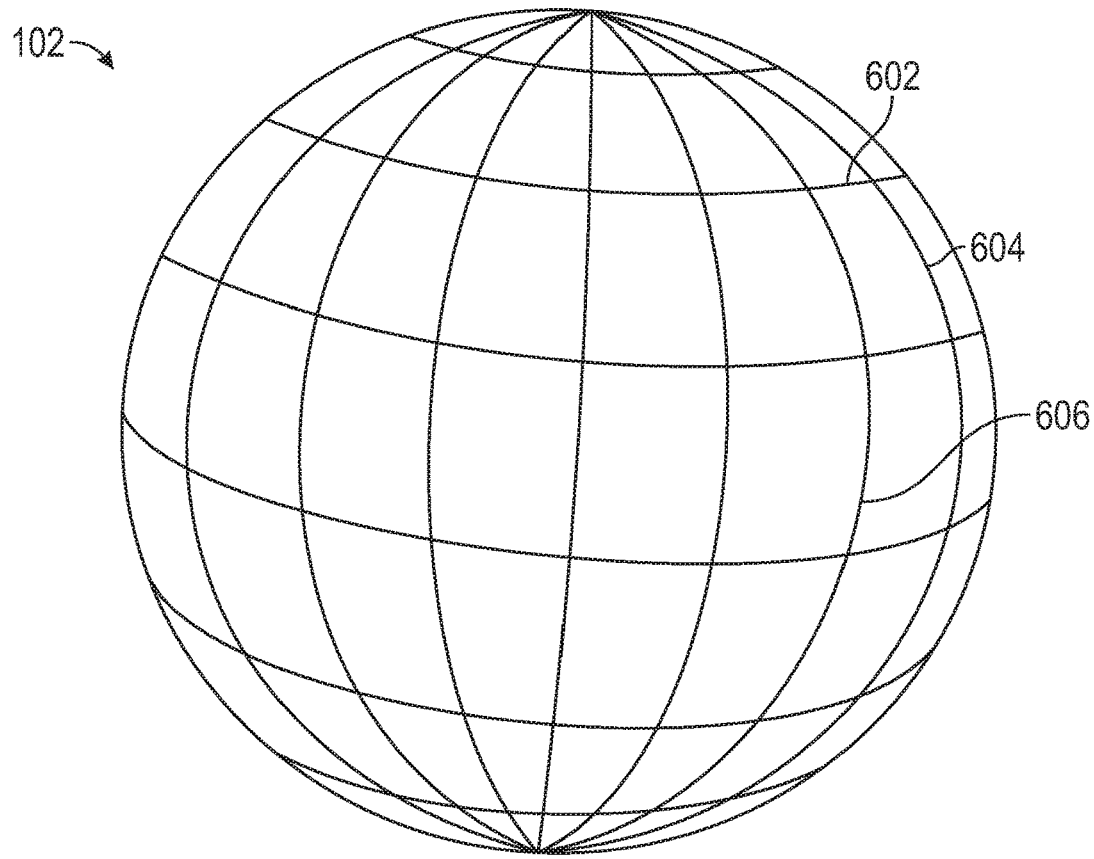
FIG. 6 depicts a simplified schematic view of the spherical stator of FIGS. 4 and 5 with coils wound thereon.
Figure 7:
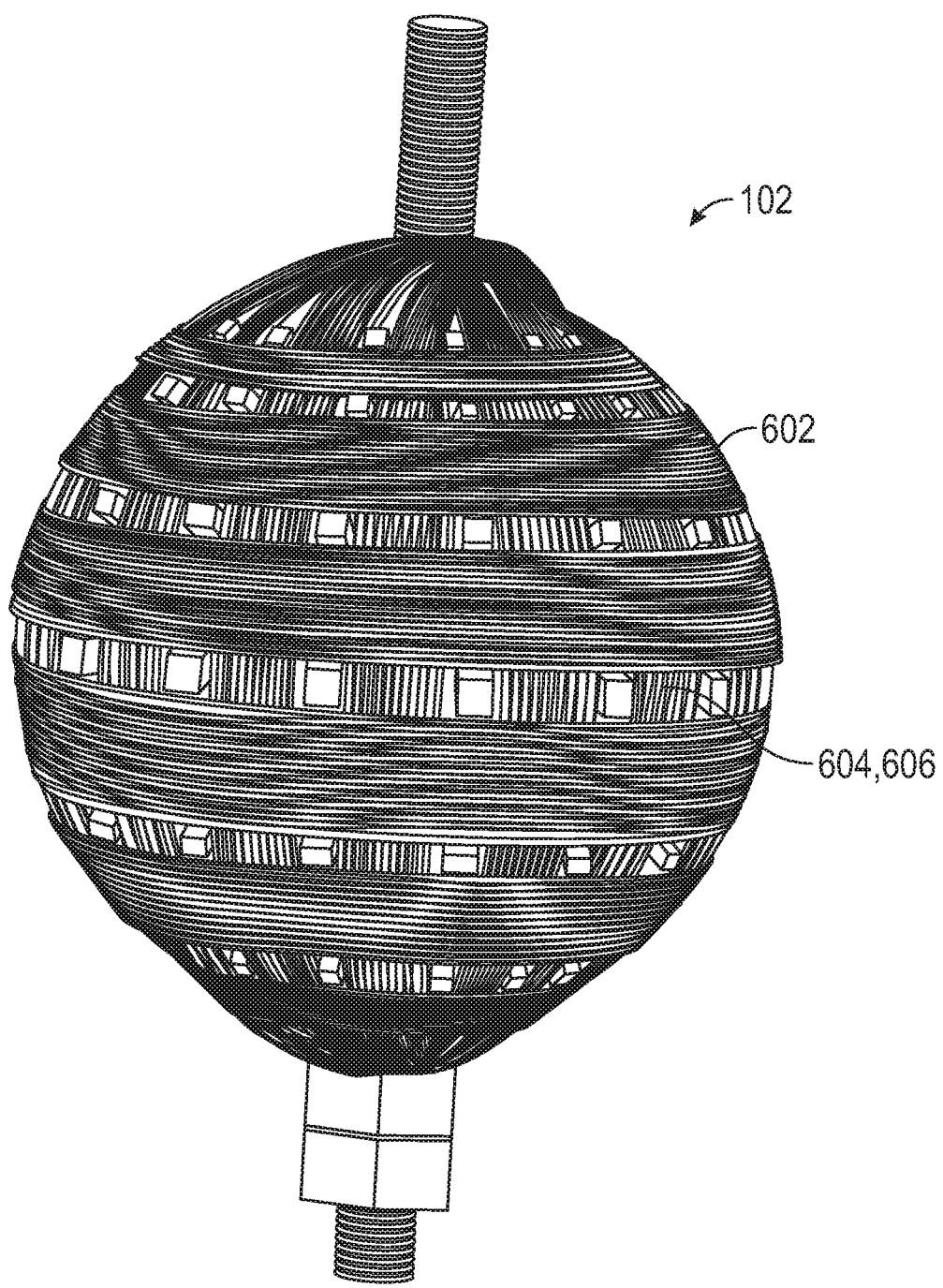
FIG. 7 depicts an example of an actual physical embodiment of the spherical stator with first, second, and third coils wound thereon.

As noted above, the protuberances 116 that are formed on the spherical stator 102 facilitate winding of coils thereon. In particular, and as shown in simplified schematic form in FIG. 6, a least a first coil 602 and a second coil 604 are each wound around at least a portion of the spherical stator 102 (i.e., around the outer surface 118). The first and second coils 602, 604 are each disposed between the plurality of spaced-apart protuberances 116 (not depicted in FIG. 6). However, the first coil 602 is disposed between the plurality of spaced-apart protuberances 116 and along latitudinal lines of the spherical stator 102, and the second coil 604 is disposed between the plurality of spaced-apart protuberances 116 and along longitudinal lines of the spherical stator 102. In some embodiments, such as the one depicted in FIG. 6, the electromagnetic machine 100 may additionally include a third coil 606. The third coil 606, when included is also wound around at least a portion of the spherical stator 102, and is disposed between the plurality of spaced-apart protuberances 116 and along the longitudinal lines of the spherical stator 102. For completeness, one example of an actual physical embodiment of the spherical stator 102 with the first, second, and third coils 602-606 wound thereon is depicted in FIG. 7.

Figure 8:
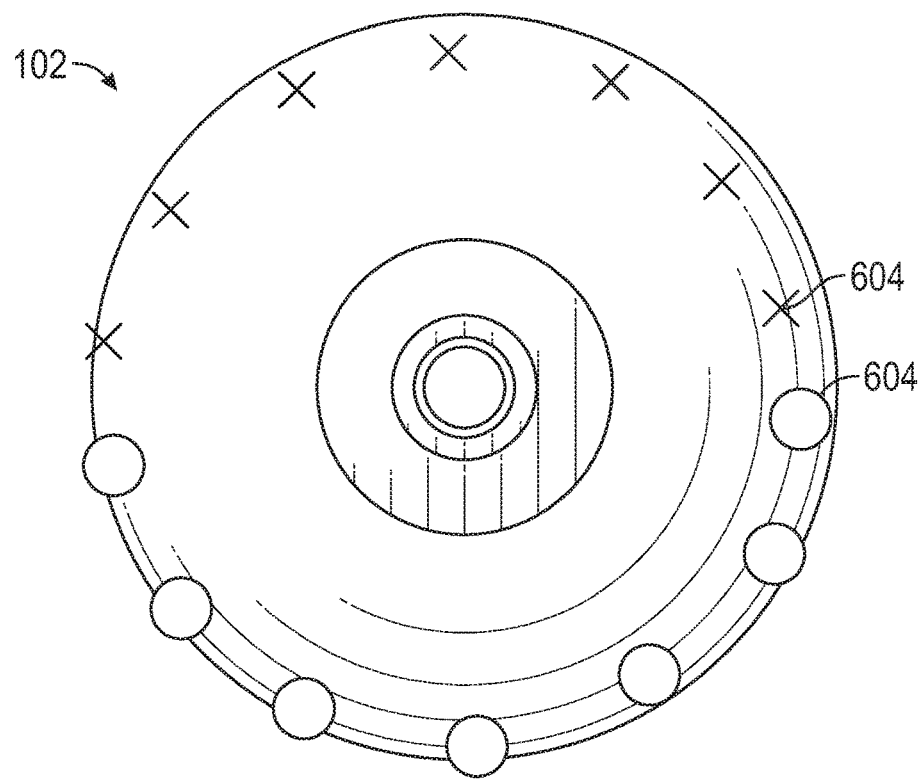
FIGS. 8 and 9 schematically depict the different directions in which certain coils are wound onto the spherical stator.
Figure 9:
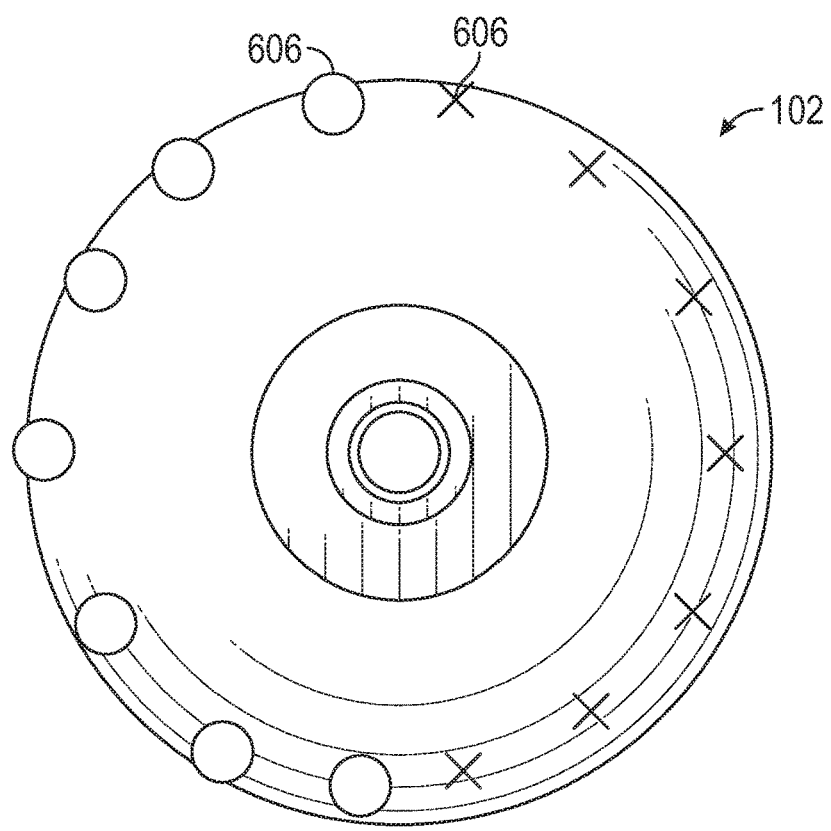

It should be noted that when the electromagnetic machine 100 is implemented with both the second and third coils 604, 606, these coils are preferably wound around the spherical stator 102 in different directions. For example, as illustrated in FIG. 8, the second coil 604 is wound around the spherical stator 102 in a first winding direction and, as illustrated in FIG. 9, the third coil 606 is wound around the spherical stator 102 in a second winding direction that is opposite the first winding direction.

The first, second, and third (when included) coils 602-606 are each formed of any one of numerous types and shapes of electrically conductive materials, and may be implemented using one or a plurality of these conductive materials. It will be appreciated that the coils 602-606 may each be implemented using single, discrete contiguous conductors, or using a plurality of conductors, and may be formed, for example, using additive (e.g., printed conductors) or subtractive (e.g., PWB etching) techniques, and may be conductive wires, ribbons, or sheets, just to name a few non-limiting examples.

The configuration of the first, second, and third (when included) coils 602-606, and the magnets 114 is such that magnetic flux travels from the one magnet (e.g., the first magnet 114-1) into the spherical stator 102 on one side and back out on the other side to the other magnet (e.g., the second magnet 114-2). The magnetic flux travels through the first, second, and third (when included) coils 602-606, and the armature 104 provides the return path for the magnetic flux. As may be appreciated, when direct current (DC) is supplied to one or more of the first, second, and third (when included) coils 602-606, a Lorentz force is generated between the energized coils 602-606 and the magnets 114, which in turn generates in a torque about one or both of the rotational axes 108, 112. The direction of the generated torque, as may also by appreciated, is based on the direction of the current flow in the first, second, and third (when included) coils 602-606. Because the spherical stator 102 is fixedly mounted, the torque that is generated will cause the armature 104 to move to an armature position relative to the stator 102.

The multi-degree of freedom spherical electromagnetic machine 100 disclosed herein is relatively smaller, less cumbersome, and more efficient than known devices, and allows for relatively less difficulty in winding the coils thereon.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electromagnetic machine, comprising:
   a spherical stator having an outer surface, the outer surface having a plurality of spaced-apart protuberances formed thereon, each protuberance extending radially from, and disposed normal to, the outer surface;
   an armature disposed adjacent to the spherical stator and including a magnet that emanates a magnetic field, the magnet having at least one of its magnetic poles facing the spherical stator;
   a first coil wound around at least a portion of the spherical stator, the first coil disposed between the plurality of spaced-apart protuberances and along latitudinal lines of the spherical stator; and
   a second coil wound around at least a portion of the spherical stator, the second coil disposed between the plurality of spaced-apart protuberances and along longitudinal lines of the spherical stator.

2. The electromagnetic machine of claim 1, wherein:
   the armature is movable to an armature position relative to the spherical stator; and
   the armature position is controlled in response to current magnitudes and directions in one or more of the first and second coils.

3. The electromagnetic machine of claim 1,
   further comprising a third coil wound around at least a portion of the spherical stator, the third coil disposed between the plurality of spaced-apart protuberances and along the longitudinal lines of the spherical stator.

4. The electromagnetic machine of claim 3, wherein:
   the armature is movable to an armature position relative to the spherical stator; and
   the armature position is controlled in response to current magnitudes and directions in one or more of the first, second, and third coils.

5. The electromagnetic machine of claim 3, wherein:
the second coil is wound around the spherical stator in a first winding direction;
the third coil is wound around the spherical stator in a second winding direction; and
the second winding direction is opposite the first winding direction.

6. The electromagnetic machine of claim 1, wherein the spherical stator comprises a magnetically permeable material.

7. The electromagnetic machine of claim 6, wherein the magnetically permeable material comprises a magnetically permeable plastic material.

8. The electromagnetic machine of claim 6, wherein the magnetically permeable material comprises iron.

9. The electromagnetic machine of claim 1, wherein the spherical stator is hollow.

10. The electromagnetic machine of claim 1, wherein the spherical stator is formed by a three-dimensional (3D) printing process.

11. An electromagnetic machine, comprising:
a spherical stator having an outer surface and formed of a magnetically permeable material, the outer surface having a plurality of spaced-apart protuberances formed thereon, each protuberance extending radially from, and disposed normal to, the outer surface;
an armature disposed adjacent to the spherical stator and including a magnet that emanates a magnetic field, the magnet having at least one of its magnetic poles facing the spherical stator;
a first coil wound around at least a portion of the spherical stator, the first coil disposed between the plurality of spaced-apart protuberances and along latitudinal lines of the spherical stator;
a second coil wound around at least a portion of the spherical stator, the second coil disposed between the plurality of spaced-apart protuberances and along longitudinal lines of the spherical stator; and
a third coil wound around at least a portion of the spherical stator, the third coil disposed between the plurality of spaced-apart protuberances and along the longitudinal lines of the spherical stator,
wherein:
the second coil is wound around the spherical stator in a first winding direction,
the third coil is wound around the spherical stator in a second winding direction, and
the second winding direction is opposite the first winding direction.

12. The electromagnetic machine of claim 11, wherein:
the armature is movable to an armature position relative to the spherical stator; and
the armature position is controlled in response to current magnitudes and directions in one or more of the first, second, and third coils.

13. The electromagnetic machine of claim 11, wherein the magnetically permeable material comprises a magnetically permeable plastic material.

14. The electromagnetic machine of claim 11, wherein the magnetically permeable material comprises iron.

15. The electromagnetic machine of claim 11, wherein the spherical stator is hollow.

16. The electromagnetic machine of claim 11, wherein the spherical stator is formed by a three-dimensional (3D) printing process.

17. An electromagnetic machine, comprising:
a hollow spherical stator having an outer surface and formed of a magnetically permeable material, the outer surface having a plurality of spaced-apart protuberances formed thereon, each protuberance extending radially from, and disposed normal to, the outer surface;
an armature disposed adjacent to the spherical stator and including a magnet that emanates a magnetic field, the magnet having at least one of its magnetic poles facing the spherical stator;
a first coil wound around at least a portion of the spherical stator, the first coil disposed between the plurality of spaced-apart protuberances and along latitudinal lines of the spherical stator;
a second coil wound around at least a portion of the spherical stator, the second coil disposed between the plurality of spaced-apart protuberances and along longitudinal lines of the spherical stator; and
a third coil wound around at least a portion of the spherical stator, the third coil disposed between the plurality of spaced-apart protuberances and along the longitudinal lines of the spherical stator,
wherein:
the spherical stator is formed by a 3D printing process,
the second coil is wound around the spherical stator in a first winding direction,
the third coil is wound around the spherical stator in a second winding direction, and
the second winding direction is opposite the first winding direction.

18. The electromagnetic machine of claim 17, wherein:
the armature is movable to an armature position relative to the spherical stator; and
the armature position is controlled in response to current magnitudes and directions in one or more of the first, second, and third coils.

19. The electromagnetic machine of claim 17, wherein the magnetically permeable material comprises a magnetically permeable plastic material.

* * * * *